(12) United States Patent
Luan et al.

(10) Patent No.: US 11,120,350 B2
(45) Date of Patent: Sep. 14, 2021

(54) MULTILEVEL PATTERN MONITORING METHOD FOR INDUSTRY PROCESSES

(71) Applicant: Jiangnan University, Wuxi (CN)

(72) Inventors: Xiaoli Luan, Wuxi (CN); Niannian Zheng, Wuxi (CN); Enbo Feng, Wuxi (CN); Chenglin Liu, Wuxi (CN); Fei Liu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 429 days.

(21) Appl. No.: 16/256,101

(22) Filed: Jan. 24, 2019

(65) Prior Publication Data

US 2019/0294987 A1 Sep. 26, 2019

Related U.S. Application Data

(63) Continuation of application No. PCT/CN2018/089589, filed on Jun. 1, 2018.

(30) Foreign Application Priority Data

Mar. 21, 2018 (CN) .......................... 201810232872.9

(51) Int. Cl.
*G06N 5/04* (2006.01)
*G08B 21/18* (2006.01)
(Continued)

(52) U.S. Cl.
CPC .......... *G06N 5/048* (2013.01); *G01M 13/003* (2019.01); *G01M 99/005* (2013.01); *G08B 21/187* (2013.01)

(58) Field of Classification Search
CPC .................................. G06N 5/00; G06N 5/048
(Continued)

(56) References Cited

U.S. PATENT DOCUMENTS

| 6,865,511 B2* | 3/2005 | Frerichs ............... G05B 23/024 700/108 |
| 2002/0077711 A1* | 6/2002 | Nixon ................ G05B 23/0272 700/51 |

(Continued)

FOREIGN PATENT DOCUMENTS

| CN | 104238545 A | 12/2014 |
| CN | 104298187 A | 1/2015 |

(Continued)

*Primary Examiner* — Ricky Go
(74) *Attorney, Agent, or Firm* — IPro, PLLC

(57) ABSTRACT

The present invention discloses a multilevel pattern monitoring method for a process industry process and belongs to the fields of industrial production and processing. The multilevel pattern monitoring method comprises the steps: dividing an industry process into a plurality of levels from the view of patterns, selecting a different key performance index for each level, acquiring operating data relevant to the key performance index, identifying the pattern of each level, and proposing a pattern monitoring method for each level based on a data driven method to realize pattern monitoring in the industry process. The effect of rapidly finding a fault is achieved by monitoring real-time data according to the pattern, identified in a clustering plane, of each level, the effect of removing the fault is achieved by the selected N variables generating the greatest influence to the current pattern in combination with an expert system and an inference engine, meanwhile, the energy consumption of the process is reduced, the operating cost is optimized, and the competitiveness of a product is improved.

17 Claims, 4 Drawing Sheets

(51) Int. Cl.
*G01M 13/003* (2019.01)
*G01M 99/00* (2011.01)

(58) Field of Classification Search
USPC .......................................................... 702/182
See application file for complete search history.

(56) References Cited

U.S. PATENT DOCUMENTS

2003/0109951 A1* 6/2003 Hsiung .............. G05B 19/4093
　　　　　　　　　　　　　　　　　　　700/108
2006/0058898 A1* 3/2006 Emigholz ............ C10G 11/187
　　　　　　　　　　　　　　　　　　　700/29

FOREIGN PATENT DOCUMENTS

| CN | 105893700 A | 8/2016 |
| CN | 106054832 A | 10/2016 |

* cited by examiner

MULTILEVEL PATTERN MONITORING METHOD FOR INDUSTRY PROCESSES

TECHNICAL FIELD

The present invention relates to a multilevel pattern monitoring method for industry processes and belongs to the field of industrial production and processing.

BACKGROUND

Core goals of the modern process industry lie in process safety, product quality as well as energy saving, emission reduction and synergia, and therefore, it is of great practical significance and value to monitor the operating state of the process in real time. With the scale expansion of a modern industry process device, the increment of process complexity, the safety of the operating process, a requirement of the market to product personalization and the like, it is more urgent to monitor the state of process operating of a complex process industry. A conventional parameter control method based on process measurement variables (such as temperature, pressure, liquid level, flow and components) is to respectively control one or more process parameters within a certain range in a single factor way so as to achieve expected product quality or operating index of a production device. However, in an industrial practice, sometimes, the consistency of final quality of a product cannot be guaranteed, and even, a production requirement may not be met always even if all the process parameters are controlled within respective expected ranges.

The reason is that parameter variables of a practical production process have multi-factor characteristics, so that process parameter variables present pattern behaviors as a whole. Patterns are essentially presentations of similarity or difference of the features of data structures of multi-variable complex systems and may be mathematically represented as that a data vector of an observation space is projected into a space with a relatively low dimension according to the lowest dimension and the highest feature distinction degree, and the relatively low orthogonal dimensions are called principal components. The "patterns" of the process parameter variables presented in a principal component feature space decide the operating efficiency of a device and the quality of the product. Therefore, an essential feature state such as a normal state, an abnormal state, an accident early state, an irreversible accident state, a high-yield state and a low-yield state, difficult to describe by using a traditional process variable model method, of a system may be more clearly presented by the patterns.

Meanwhile, with the rapid development of a computer storage technology, massive process data may be acquired and stored. However, the industry process is always abundant in data and deficient in knowledge due to the shortage of sufficient process experiences and application tools. The existing data monitoring is only limited to process parameter monitoring, and a production process in the process industry cannot be macroscopically shown on multiple levels, so that the time of finding problems, estimating loss and taking remedial actions is relatively long, and even more serious economic and energy loss is caused due to incapability of stopping loss in time. Therefore, providing a multilevel pattern monitoring method for a process industry process is of great significance to the enrichment and development of a process control theory and has an important theoretical value and practical significance to the reduction of energy consumption of the process, the optimization of operating cost, the improvement of product competitiveness and the like, and the multilevel pattern monitoring method definitely has a wide application prospect in the process industry.

SUMMARY

The present invention discloses a multilevel pattern monitoring method for a process industry process, and the method comprises: dividing the industry process into a plurality of levels from the view of patterns, selecting a different key performance index for each level, acquiring operating data relevant to the key performance index, identifying the pattern of each level, and proposing a pattern monitoring method for each level based on a data driven method.

Alternatively, the multilevel pattern monitoring method comprises:

step 1: subjecting the facilities in the industry process to multilevel architecture division;

step 2: selecting a key performance index of each level in a multilevel architecture obtained by division in step 1, and acquiring offline data, relevant to the key performance index, of each level in the multilevel architecture;

step 3: analyzing the offline data acquired in step 2 by using a clustering analysis method, and respectively identifying a pattern of each level in a corresponding clustering plane; and step 4: monitoring real-time data according to the pattern, identified on the clustering plane, of each level in step 3.

Alternatively, the multilevel pattern monitoring method further comprises: removing a singular point before analyzing the acquired offline data by using the clustering analysis method in step 3.

Alternatively, the pattern in step 3 includes at least one of a normal pattern, a fault pattern, a high-efficiency pattern, a medium-efficiency pattern, a low-efficiency pattern and an expected pattern.

Alternatively, the multilevel pattern monitoring method further comprises:

calculating an economic index value in combination with a specific process, and displaying a relationship between the economic index value and real-time data in real time in a first predetermined way, wherein the first predetermined way comprises a broken line diagram way, a bar diagram way, a columnar diagram way and a scatter diagram way.

Alternatively, the multilevel pattern monitoring method further comprises:

selecting N variables generating the greatest influence to the current pattern corresponding to the real-time data, wherein N is an integer larger than or equal to 2; and performing sequential display according to the degree of the influence of each variable to the current pattern, wherein a display way comprises a transverse columnar diagram.

Alternatively, the multilevel pattern monitoring method further comprises:

calculating a distance from a projection point of the pattern at the current moment on the clustering plane to the fault pattern according to a spatial distance calculating method, wherein the spatial distance calculating method comprises a Mahalanobis distance calculating method; and calculating the fault occurrence probability at the current moment according to the calculated distance.

Alternatively, the multilevel pattern monitoring method further comprises:

displaying the fault occurrence probability at the current moment in real time, and giving a fault handling method.

Alternatively, the multilevel pattern monitoring method further comprises:

predicting the remaining time of fault occurrence according to the calculated distance, and performing real-time display.

Alternatively, the multilevel pattern monitoring method further comprises:

giving an alarm when the predicted fault occurrence probability is larger than a first predetermined value and/or the predicted remaining time of fault occurrence is smaller than a second predetermined value.

Alternatively, the clustering analysis method in step 3 comprises a principal component analysis method, a K-means clustering method, a Bayesian classification method and a potential function discrimination method.

Alternatively, subjecting the facilities in the industry process to multilevel architecture division in step 1 comprises:

dividing the facilities in the industry process into an equipment level, an operating unit level, a facility level and a plant level.

Alternatively, the equipment level comprises one or more of a pump, a control valve, a pipeline, a heat exchanger and a compressor.

Alternatively, the operating unit level comprises one or more of a reactor, a heater, a rectifying tower, a shift converter, a separator, a flash evaporator and an evaporator.

Alternatively, the facility level is a combination of at least two operating units; and the plant level is a combination of at least two facilities.

Alternatively, calculating the economic index value in combination with a specific process comprises:

calculating a distance from the projection point of the pattern at the current moment on the clustering plane to the expected pattern according the spatial distance calculating method;

converting the calculated distance into the economic index value in combination with the specific process; and displaying the calculated economic index value in real time by using the first predetermined way, wherein the first predetermined way comprises the broken line diagram way, the bar diagram way, the columnar diagram way and the scatter diagram way.

Alternatively, giving the alarm in the step of giving an alarm when the predicted remaining time of fault occurrence is smaller than a second predetermined value comprises:

pushing a message to a responsible person of a corresponding authority in a second predetermined way, wherein the second predetermined way comprises at least one of a mail way, a voice telephone way and a short message way.

Alternatively, the multilevel pattern monitoring method further comprises:

predicting and displaying a fault reason and a corresponding handling suggestion according to the selected N variables generating the greatest influence to the current pattern in combination with an expert system and an inference engine; and storing the fault reason and the corresponding handling suggestion into an accident database.

The present invention has the beneficial effects:

the present invention provides the multilevel pattern monitoring method for the industry process, pattern monitoring in the industry process is realized, and compared with conventional parameter monitoring based on process measurement variables, the multilevel pattern monitoring method is that the performance index of each level is simulated in each pattern of each level, the monitoring of each level from micro level to macro level is realized, the effect of rapidly finding a fault is achieved by monitoring real-time data according to the pattern, identified in a clustering plane, of each level, the effect of removing the fault is achieved by the selected N variables generating the greatest influence to the current pattern in combination with an expert system and an inference engine, meanwhile, the energy consumption of the process is reduced, the operating cost is optimized, and the competitiveness of the product is improved.

DETAILED DESCRIPTION

The technical scheme of the present invention is clearly and completely described by taking a crude oil processing process as an example in the following embodiments, and it is apparent that the described embodiments are only parts instead of all of embodiments of the prevent invention. Based on the embodiments in the present invention, all other embodiments obtained on the premise of no creative labor of the skilled in the art fall into the protection scope of the present invention.

Embodiment 1

Figure 1:
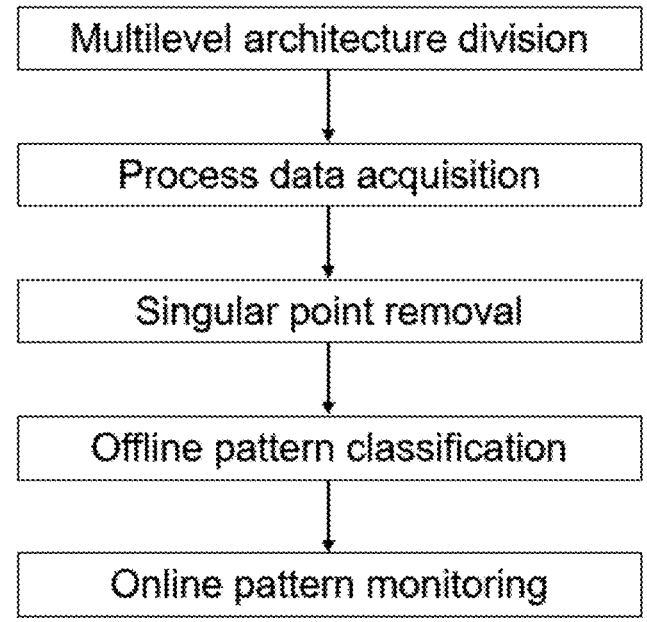
FIG. 1 is a flow diagram of an implementation step of an embodiment of the present invention.

According to a multilevel pattern monitoring method for a process industry process, provided by the embodiment, an industry process is divided into a plurality of levels from the view of patterns, a different key performance index is selected for each level, operating data relevant to the key performance index is acquired, the pattern of each level is identified, and a pattern monitoring method for each level is proposed based on the data driven method. Referring to FIG. 1, the multilevel pattern monitoring method comprises:

Step 1: Subject facilities in the industry process to multilevel architecture division.

Figure 2:
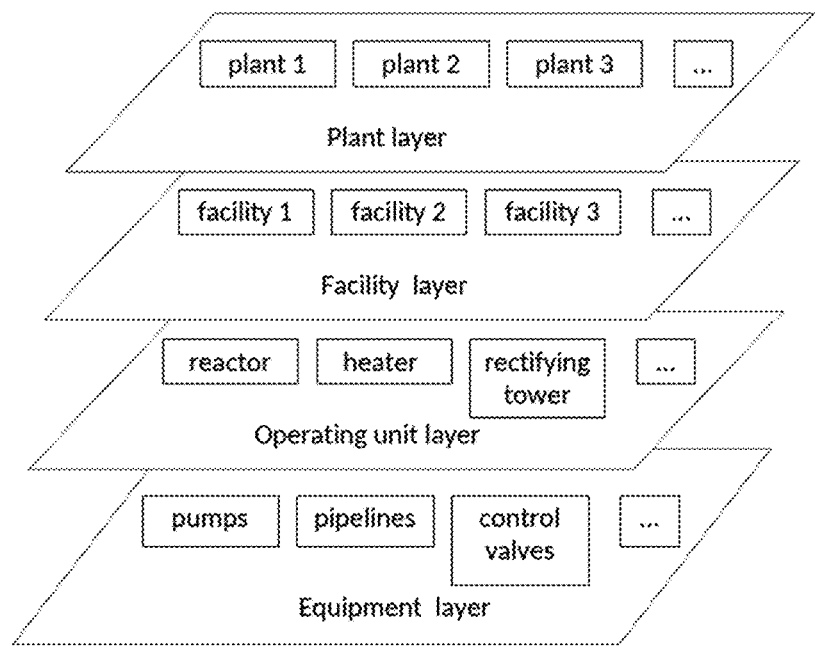
FIG. 2 is a schematic diagram of a layered architecture of a process industry process.

Specifically, the facilities in a production process of crude oil processing is divided, a pump, a control valve, a pipeline, a heat exchanger and the like are combined into an equipment level, a reactor, a heater, a rectifying tower and the like are combined into an operating unit level, a plurality of operating units are combined into a facility level, and a plurality of facilities form a plant level. FIG. 2 is a schematic diagram of a layered architecture of the process industry process.

Step 2: Select a key performance index of each level in a multilevel architecture obtained by division in step 1, and acquire offline data, relevant to the key performance index, of each level in the multilevel architecture.

The safe operation of the facility is selected as the performance index by taking a crude oil desalting and dehydrating facility level as an example, and 50 groups of offline data relevant to the performance index are acquired.

Step 3: Analyze the offline data acquired in step 2 by using a clustering analysis method, and identify a pattern of each level respectively in a corresponding clustering plane.

Specifically, a normal pattern, a fault pattern, a high-efficiency pattern, a medium-efficiency pattern, a low-efficiency pattern, an expected pattern and the like of each level of the equipment level, the operating unit level, the facility level and the plant level are respectively drawn on the clustering plane on the basis of deeply understanding the process and are displayed in a monitoring interface.

Step 4: Monitor real-time data according to the pattern, identified on the clustering plane, of each level in step 3.

A pattern trajectory changed with time is drawn in a historical pattern clustering plane of each level of the equipment level, the operating unit level, the facility level and the plant level by utilizing the real-time data and is displayed on the monitoring interface in real time.

The pattern of the real-time data at each moment within a past time period may be known according to a diagram of a past time period pattern trajectory in which the real-time data is changed with time, and a responsible person may know that a fault occurs at the current moment once the real-time data is found to be in the fault pattern.

According to the multilevel pattern monitoring method, the facilities in the industry process is subjected to the multilevel architecture division; the key performance index of each level in the multilevel architecture obtained by division is selected, and the offline data, relevant to the key performance index, of each level in the multilevel architecture is acquired; the acquired offline data is analyzed by using the clustering analysis method, and the pattern of each level is respectively identified on the corresponding clustering plane; and the real-time data is monitored according to the pattern, identified on the clustering plane, of each level, so that functions of monitoring the real-time data and rapidly finding the fault are achieved.

Embodiment 2

The specific implementation step and algorithm of the present invention are as follows:

Step 1: Subject facilities in the industry process to multilevel architecture division.

Specifically, the facilities in a production process is divided by taking a process industry process of crude oil processing as an example, wherein a pump, a control valve, a pipeline, a heat exchanger and the like are combined into an equipment level, a reactor, a heater, a rectifying tower and the like are combined into an operating unit level, a plurality of operating units are combined into a facility level, and a plurality of facilities form a plant level. FIG. 2 is an example of a layered architecture of the process industry process.

Step 2: Select a key performance index of each level in a multilevel architecture obtained by division in step 1, acquire offline data, relevant to the key performance index, of each level in the multilevel architecture, and remove a singular point.

Different key performance indexes are respectively selected for the equipment level, the operating unit level, the facility level and the plant level which are different, operating data relevant to the key performance indexes are acquired and are subjected to clustering analysis, and the singular point is removed in a clustering plane, so that all data points are on a confidence level.

Figure 3:
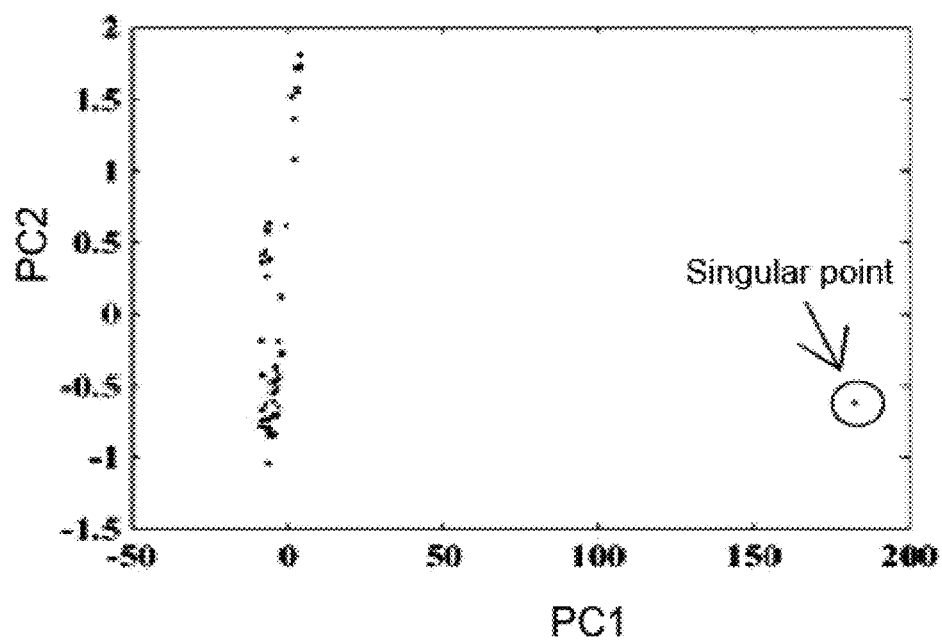
FIG. 3 is a diagram of a principal component pattern of a crude oil desalting and dehydrating facility level.

The safe operation of the facility is selected as the performance index by taking a crude oil desalting and dehydrating facility level as an example, 50 groups of operating data relevant to the index are acquired to be subjected to clustering analysis, which is described by taking analysis realized by using a principal component analysis method as an example herein. FIG. 3 is a diagram of a principal component pattern of the crude oil desalting and dehydrating facility level, there is a group of data having a great difference from the whole data pattern at the right in FIG. 3, and therefore, the group of data should be removed.

Step 3: Analyze the offline data acquired in step 2 by using a clustering analysis method, and identify a pattern of each level respectively in a corresponding clustering plane.

Specifically, analysis realized by using the principal component analysis method is taken as an example for description in the embodiment, and clustering analysis may also be performed by using any one of a K-means clustering method, a Bayesian classification method and a potential function discrimination method in practical application.

Figure 4:
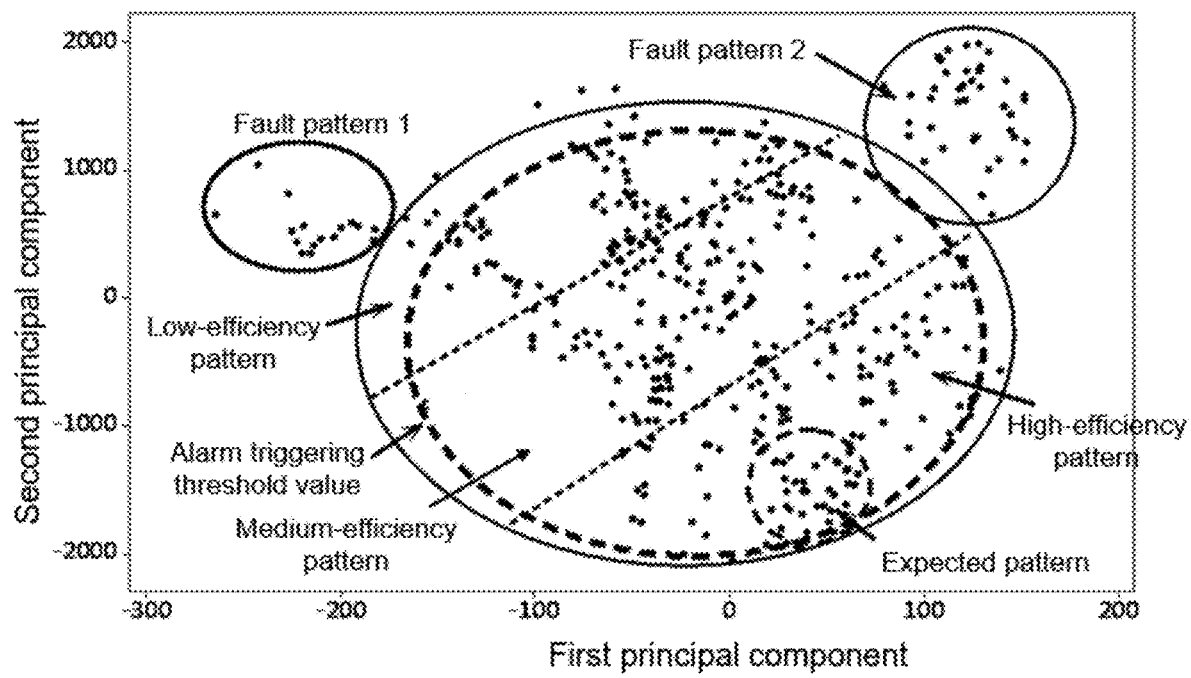
FIG. 4 is a classification diagram of an offline pattern of a crude oil desalting and dehydrating facility.

A normal pattern, a fault pattern, a high-efficiency pattern, a medium-efficiency pattern, a low-efficiency pattern, an expected pattern and the like of each level of the equipment level, the operating unit level, the facility level and the plant level are respectively drawn in each principal component plane on the basis of deeply understanding the process and are displayed in a monitoring interface. The crude oil desalting and dehydrating facility level in step 2 is taken as an example, and the normal pattern, the fault pattern, the high-efficiency pattern, the medium-efficiency pattern, the low-efficiency pattern and the expected pattern of a crude oil desalting and dehydrating facility are identified offline in two principal component planes by utilizing the remaining 49 groups of data in combination with a crude oil desalting and dehydrating process. FIG. 4 is a classification diagram of an offline pattern of the crude oil desalting and dehydrating facility.

Step 4: Monitor real-time data according to the pattern, identified on the clustering plane, of each level in step 3.

Figure 5:
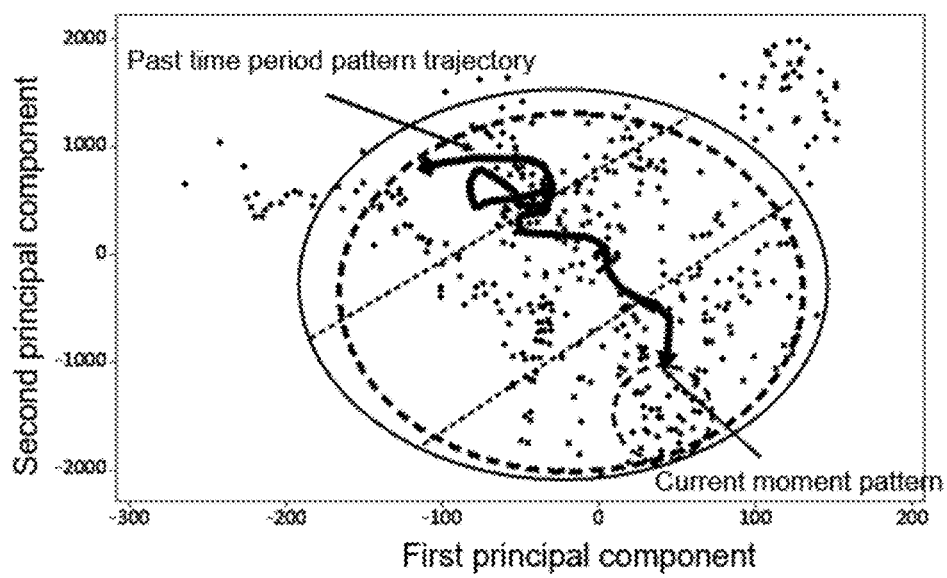
FIG. 5 is a diagram of a past time period pattern trajectory, changed with time, of the crude oil desalting and dehydrating facility.

A pattern trajectory changed with time is drawn in a historical pattern principal component plane of each level of the equipment level, the operating unit level, the facility level and the plant level by utilizing the real-time data and is displayed on the monitoring interface in real time. The crude oil desalting and dehydrating facility level in step 2 is taken as an example, and FIG. 5 is a diagram of a past time period pattern trajectory, changed with time, of the crude oil desalting and dehydrating facility.

Step 5: Calculate a distance from a projection point of the pattern at the current moment on the clustering plane to the expected pattern according to a spatial distance calculating method, wherein the spatial distance calculating method comprises a Mahalanobis distance calculating method.

The Mahalanobis distance calculating method is taken as an example for description herein, and a distance from each of projection points of the pattern at the current moment on the two principal component planes to the expected pattern is calculated.

Step 6: Convert the calculated distance into a specific economic value according to the calculated distance from the projection point of the pattern at the current moment on the clustering plane to the expected pattern in step 5 in combination with a crude oil desalting and dehydrating process, a loss value is displayed in a curve diagram way in real time, and real-time display may be performed in any one way of a broken line diagram way, a bar diagram way, a columnar diagram way and a scatter diagram way in practical application.

Figure 6:
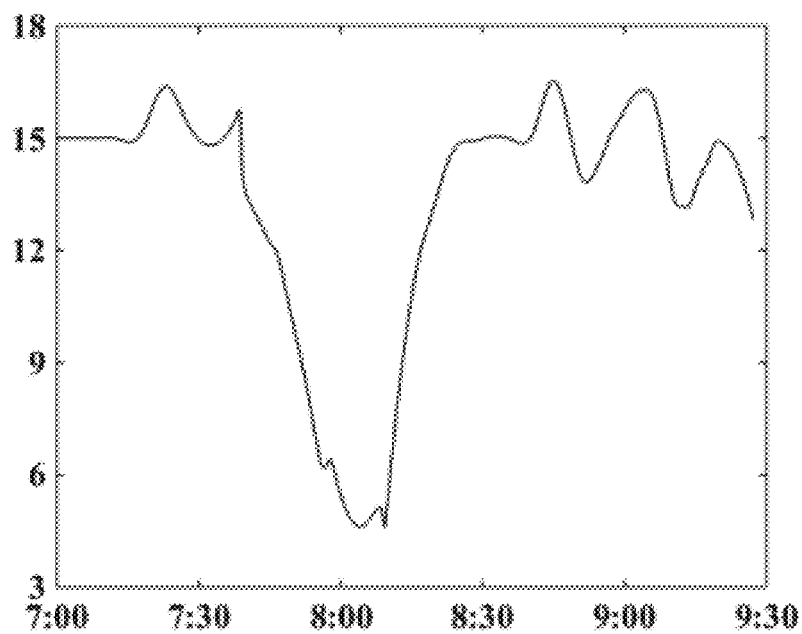
FIG. 6 is a curve diagram of value loss of the crude oil desalting and dehydrating facility.

As shown in FIG. 6, FIG. 6 is a curve diagram of value loss of the crude oil desalting and dehydrating facility.

Step 7: Select N variables generating the greatest influence to the current pattern corresponding to the real-time data, wherein N is an integer larger than or equal to 2; sequential display is performed according to the degree of the influence of each variable to the current pattern, and a display way comprises a transverse columnar diagram.

A principal component reconstruction method, for example, a contribution method, is taken as an example in the embodiment, and the three most important variables generating an influence to the pattern at the current moment are found, are ordered according to a contribution degree of each variable, are ordered in a transverse columnar diagram way according to the contribution degree and are displayed on the monitoring interface in real time.

Figure 7:
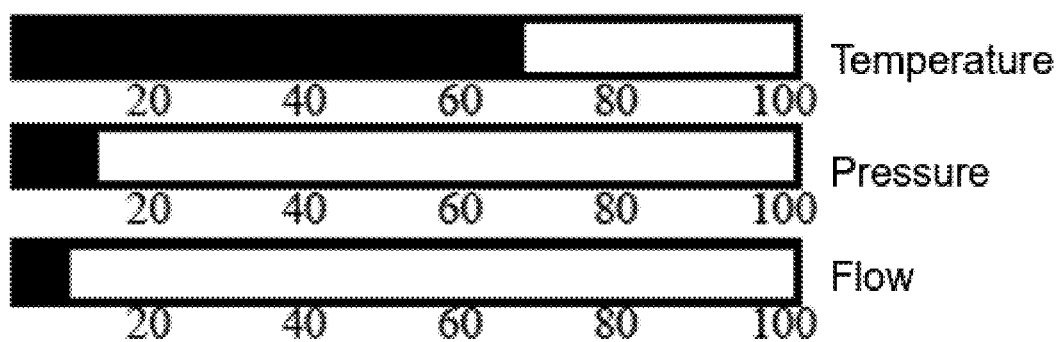
FIG. 7 is a transverse columnar diagram showing that three most important variables of the crude oil desalting and dehydrating facility are ordered according to a contribution degree.

FIG. 7 is a transverse columnar diagram showing that three most important variables of the crude oil desalting and dehydrating facility are ordered according to a contribution degree.

Step 8: Calculate a distance from the projection point of the pattern at the current moment on the clustering plane to the fault pattern according to a spatial distance calculating method, wherein the spatial distance calculating method comprises a Mahalanobis distance calculating method.

The Mahalanobis distance calculating method is taken as an example for description herein, and a distance from each of projection points of the pattern at the current pattern of the crude oil desalting and dehydrating facility on the two principal component planes to the fault pattern is calculated.

Step 9: Calculate the fault occurrence probability at the current moment according to the calculated distance from the projection point of the pattern at the current moment on the clustering plane to the fault pattern; display the fault occurrence probability at the current moment in real time.

The fault occurrence probability of the crude oil desalting and dehydrating facility is calculated according to the calculated distance from the projection point of the pattern at the current moment on the clustering plane to the fault pattern in step 8, and the fault occurrence probability at the current moment is displayed on the monitoring interface in real time.

Step 10: Give an alarm when the predicted fault occurrence probability is larger than a first predetermined value, and predict and display a fault reason and a corresponding handling suggestion according to the selected N variables generating the greatest influence to the current pattern in combination with an expert system and an inference engine; and store the fault reason and the corresponding handling suggestion into an accident database.

Specifically, the alarm is given if the fault occurrence probability at the current moment exceeds a certain threshold value (for example, 90%). Meanwhile, the fault reason and the handling suggestion are given by utilizing the expert system and the inference engine in combination with the three variables reconstructed in step 7, and the suggestion is displayed on the monitoring interface and is also stored into the accident database.

Step 11: Predict and display the remaining time of fault occurrence in real time according to the calculated distance; when the predicted remaining time of fault occurrence is smaller than a second predetermined value, display the remaining time of fault occurrence in real time, and give an alarm.

The remaining time when a fault is about to occur is predicted according to the calculated distance from the projection point of the pattern at the current moment on the clustering plane to the fault pattern in step 8, and if the remaining time is smaller than special time (for example, 1 hour), the alarm is given, and the remaining time is displayed.

Specifically, in steps 10 and 11, the alarm is given when the predicted fault occurrence probability is larger than the first predetermined value and/or the predicted remaining time of fault occurrence is smaller than the second predetermined value, namely the alarm is given if any one of the two conditions occur, a message is pushed to a responsible person of a corresponding authority in a second predetermined way, and the second predetermined way comprises at least one of a mail way, a voice telephone way and a short message way; and in practical application, the message may be pushed to the responsible person of the corresponding authority in any one way or various ways adopted at the same time. The first predetermined value may be set as 90% in step 10 according to the practical application or other values; and the second predetermined value may be set as 1 hour in step 11 according to the practical application or other values in combination with the reality.

According to the multilevel pattern monitoring method, the facilities in the industry process is subjected to the multilevel architecture division; the key performance index of each level in the multilevel architecture obtained by division is selected, and the offline data, relevant to the key performance index, of each level in the multilevel architecture is acquired; the acquired offline data is analyzed by using the clustering analysis method, and the pattern of each level is respectively identified on the corresponding clustering plane; and the real-time data is monitored according to the pattern, identified on the clustering plane, of each level, so that functions of monitoring the real-time data and rapidly finding the fault are achieved; the alarm is given by calculating the fault occurrence probability and the remaining time of fault occurrence, sequential display is performed according to the degree of the influence of each variable to the current pattern, the fault reason and the corresponding handling suggestion are predicted according to the N variables generating the greatest influence to the current pattern corresponding to the real-time data in combination with the expert system and the inference engine, so that the fault may be removed in time after being found; and the fault reason and the corresponding handling suggestion are stored into the accident database, so that a similar fault may be rapidly removed when occurring again later. By combining the monitoring method, the energy consumption of the process is reduced, the operating cost is optimized, and the competitiveness of a product is improved.

Preferred embodiments of the present invention have been disclosed as above, but are not intended to limit the present invention, and various alterations and modifications may be made by any one skilled in the art without departing from the spirit and range of the present invention, so that the protection scope of the present invention should be subject to the scope defined in the claims.

What is claimed is:

1. A multilevel pattern monitoring method for a process industry, comprising: dividing an industry process into a plurality of levels from view of patterns, selecting a different key performance index for each level, acquiring operating data relevant to the key performance index, identifying pattern of each level, and proposing a pattern monitoring method for each level based on a data driven method;

step 1: subjecting facilities in the industry process to multilevel architecture division;

step 2: selecting a key performance index of each level in a multilevel architecture obtained by division in step 1, and acquiring offline data, relevant to the key performance index, of each level in the multilevel architecture;

step 3: analyzing the offline data acquired in step 2 by using a clustering analysis method, and respectively identifying a pattern of each level in a corresponding clustering plane; and step 4: monitoring real-time data according to the pattern, identified on a clustering plane, of each level in step 3.

2. The multilevel pattern monitoring method of claim 1, further comprising: removing a singular point before analyzing acquired offline data by using the clustering analysis method in step 3.

3. The multilevel pattern monitoring method of claim 1, wherein the pattern in step 3 includes at least one of a normal pattern, a fault pattern, a high-efficiency pattern, a medium-efficiency pattern, a low-efficiency pattern and an expected pattern.

4. The multilevel pattern monitoring method of claim 1, further comprising:

calculating an economic index value in combination with a specific process, and displaying a relationship between the economic index value and real-time data in real time in a first predetermined way, wherein the first predetermined way comprises a broken line diagram way, a bar diagram way, a columnar diagram way and a scatter diagram way.

5. The multilevel pattern monitoring method of claim 4, wherein calculating the economic index value in combination with a specific process comprises:

calculating a distance from projection point of a pattern at current moment on the clustering plane to expected pattern according spatial distance calculating method;

converting the calculated distance into the economic index value in combination with the specific process; and displaying a calculated economic index value in real time by using the first predetermined way, wherein the first predetermined way comprises the broken line diagram way, the bar diagram way, the columnar diagram way and the scatter diagram way.

6. The multilevel pattern monitoring method of claim 1, further comprising:

selecting N variables generating greatest influence to current pattern corresponding to the real-time data, wherein N is an integer larger than or equal to 2;

and performing sequential display according to degree of the influence of each variable to the current pattern, wherein a display way comprises a transverse columnar diagram.

7. The multilevel pattern monitoring method of claim 6, further comprising:

predicting and displaying a fault reason and a corresponding handling suggestion according to the selected N variables generating the greatest influence to the current pattern in combination with an expert system and an inference engine; and storing the fault reason and the corresponding handling suggestion into an accident database.

8. The multilevel pattern monitoring method of claim 1, further comprising:

calculating a distance from a projection point of pattern at current moment on the clustering plane to fault pattern according to a spatial distance calculating method, wherein the spatial distance calculating method comprises a Mahalanobis distance calculating method; and calculating fault occurrence probability at the current moment according to a calculated distance.

9. The multilevel pattern monitoring method of claim 8, further comprising:

displaying the fault occurrence probability at the current moment in real time, and giving a fault handling method.

10. The multilevel pattern monitoring method of claim 9, further comprising:

giving an alarm when predicted fault occurrence probability is larger than a first predetermined value and/or predicted remaining time of fault occurrence is smaller than a second predetermined value.

11. The multilevel pattern monitoring method of claim 10, wherein giving an alarm in the step of giving an alarm when the predicted remaining time of fault occurrence is smaller than a second predetermined value comprises:

pushing a message to a responsible person of a corresponding authority in a second predetermined way, wherein the second predetermined way comprises at least one of a mail way, a voice telephone way and a short message way.

12. The multilevel pattern monitoring method of claim 8, further comprising:

predicting remaining time of fault occurrence according to the calculated distance, and performing real-time display.

13. The multilevel pattern monitoring method of claim 1, wherein the clustering analysis method in step 3 comprises a principal component analysis method, a K-means clustering method, a Bayesian classification method and a potential function discrimination method.

14. The multilevel pattern monitoring method of claim 1, wherein subjecting facilities in the industry process to multilevel architecture division in step 1 comprises:

dividing the facilities in the industry process into an equipment level, an operating unit level, a facility level and a plant level.

15. The multilevel pattern monitoring method of claim 14, wherein the equipment level comprises one or more of a pump, a control valve, a pipeline, a heat exchanger and a compressor.

16. The multilevel pattern monitoring method of claim 14, wherein the operating unit level comprises one or more reactor, a heater, a rectifying tower, a shift converter, a separator, a flash evaporator and an evaporator.

17. The multilevel pattern monitoring method of claim 14, wherein the facility level comprises a combination of at least two operating units; and plant level is a combination of at least two facilities.

* * * * *